United States Patent [19]

Huret

[11] 4,174,851

[45] Nov. 20, 1979

[54] BICYCLE FRAME SUPPORT MEMBER

[76] Inventor: Roger H. Huret, 60, avenue Félix Faure, Nanterre (Hauts-de-Seine), France

[21] Appl. No.: 852,358

[22] Filed: Nov. 17, 1977

[30] Foreign Application Priority Data

Nov. 17, 1976 [FR] France .............................. 76 34639

[51] Int. Cl.² ........................................... B62K 19/30
[52] U.S. Cl. .................................. 280/288; 74/217 B
[58] Field of Search ................... 280/281 R, 288, 238; 74/217 B; 254/190

[56] References Cited

FOREIGN PATENT DOCUMENTS

| | | | |
|---|---|---|---|
| 734244 | 10/1932 | France | 74/217 B |
| 1040852 | 10/1953 | France | 280/288 |
| 1200495 | 12/1959 | France | 74/217 B |
| 332033 | 8/1958 | Switzerland | 74/217 B |

Primary Examiner—Joseph F. Peters, Jr.
Assistant Examiner—Michael Mar
Attorney, Agent, or Firm—Lerner, David, Littenberg & Samuel

[57] ABSTRACT

Bicycle frame support member for holding the axle of a rear wheel provided with a plurality of sprocket wheels, of the type comprising at least an upper end adapted to be connected to the frame of the bicycle, a lower end to which is fixed the body of a derailer, and an elongated notch adapted to receive the axle of the wheel, the support member further comprising a lug pierced with an orifice, disposed on the upper part of the support and projecting towards the outside with respect to the plane of the support and intended to guide the derailer-actuating cable which passes through the orifice pierced in said lug.

10 Claims, 3 Drawing Figures

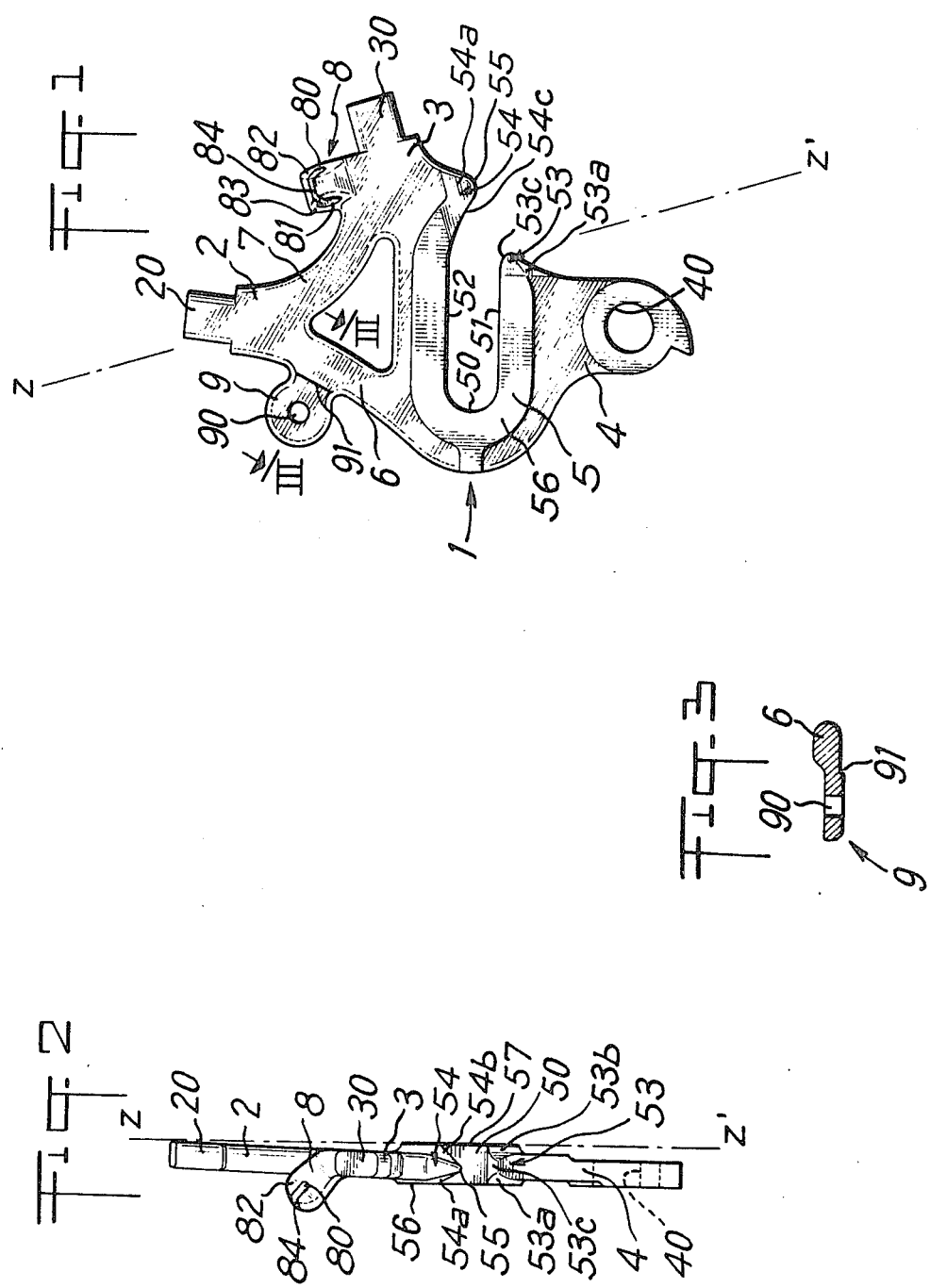

BICYCLE FRAME SUPPORT MEMBER

The present invention relates to a bicycle frame support member for holding the axle of a rear wheel provided with a plurality of sprocket wheels, of the type comprising at least an upper end adapted to be connected to the frame of the bicycle, a lower end to which the body of a derailleur is fixed, and an elongated notch adapted to receive the axle of the wheel.

Such a member, manufactured separately by forging or casting, is connected to the rear and lower ends, respectively, of a stay and a base of the tubes constituting the frame of the bicycle, then the derailleur mechanism is fixed to said support member. The cable actuating the derailleur mechanism passes along the lower part of the frame (base) which is substantially horizontal and located with respect to the derailleur. The cable is held in position with the aid of a ring fixed on the frame, or with the aid of an element brazed on the frame. This point of fixation of the derailleur-actuating cable is generally placed in a relatively remote position from the rear end of the frame, with the result that the protective sheath of the cable is relatively long and forms a large loop which risks getting easily caught by mistake. Furthermore, the placing of a ring on the frame or the brazing of an added element constitute supplementary operations during assembly of a bicycle.

It is a particular object of the present invention to improve the fixing of the derailleur-actuating cable whilst simplifying the manufacture and assembly of the bicycle.

It is a further object of the present invention to facilitate the rapid and precise engagement of the axle of a bicycle wheel in the corresponding support member, so that the support member according to the invention, whilst allowing a better functioning of the control of a derailleur, also facilitates dismantling and remounting of the rear bicycle wheel.

The presently known support members have an elongated notch with parallel edges, which is slightly inclined downwardly. The face of the support member facing the wheel is substantially rectilinear. This results in certain manoeuvring difficulties when dismantling the wheel and removing mobile members such as the bicycle chain.

The present invention enables the above-mentioned drawbacks to be overcome, whilst ensuring easy manufacture, due to the formation, on a support member of the type mentioned hereinabove, of supplementary portions in relief which are integral with said support, are produced when the support member is manufactured and facilitate the manoeuvre of the removable elements cooperating with the support member.

In accordance with the invention, a support member of the type mentioned hereinabove further comprises a lug pierced with an orifice, disposed on the upper part of the support and projecting outwardly with respect to the plane of the support, and intended to guide the derailleur-actuating cable which passes through said orifice made in said lug.

The orifice in the lug is preferably slightly inclined downwardly and outwardly in its rear part.

Such an embodiment of the lug or flange for holding the derailleur-actuating cable has several advantages. Being formed on the very support member, the cable-holding flange is disposed in an extreme rear position with respect to the frame and avoids the part of the cable which is included between the holding flange and the derailleur constituting too large a loop. The length of the protective sheath is then reduced. The risks of catching are also much less than with a conventional mode of fixing, nearer the front of the frame. Furthermore, the production of the flange, incorporated in the support member which is, itself, manufactured independently by forging or casting for example, is extremely simple and does not involve any supplementary assembly operation by brazing or fixing by a ring.

According to a particular embodiment of the invention, the orifice pierced in the lug for guiding the derailleur-actuating cable comprises a diameter reduced at the front, only slightly larger than the diameter of the cable, and a larger diameter in its rear portion, to receive a protective sheath for said derailleur-actuating cable.

According to a particular feature of the invention, the guide lug presents rounded edges without sharp angles. This particularly avoids the protuberance constituted by said lug causing injury.

According to another feature of the present invention, the support member comprises an elongated notch whose side face located opposite the bicycle wheel is slightly offset towards the outside of the support. The outer side face offset with respect to the bicycle wheel is substantially plumb with the face of the end of the upper part of the support member which faces the wheel.

The invention will be more readily understood on reading the following description with reference to the accompanying drawings, in which:

FIG. 1 is a view in elevation of a support member, seen from the side opposite the wheel.

FIG. 2 is a front view of the member of FIG. 1.

FIG. 3 is a section along III—III of FIG. 1.

Referring now to the drawings, FIGS. 1 and 2 show a support member 1 adapted to receive the rear wheel axle of a bicycle.

The support member 1 has two upper ends 2 and 3 connected respectively to a frame stay slightly inclined with respect to the vertical (axis Z'Z) and to a frame base which is substantially horizontal or slightly inclined with respect to the horizontal. A lower end 4 serves as support for a derailleur body (not shown), the support 1 being provided to receive the end of an axle with multiple sprocket wheels located with respect to said sprocket wheels. The central part 5 of the support 1 is in the form of an elongated C. The C-shaped part 5 surmounts the lower end 4, is connected to the end 3 by the front part of its upper face and to the upper end 2 by a branch 6. The ends 2 and 3 are themselves connected by a branch 7. An empty space 10 is made between the branches 6,7 and the C-shaped part 5, in order to lighten the member. The upper ends 2 and 3 of the support 1 present narrow portions 20 and 30 respectively, intended to fit into the corresponding frame tubes when the support 1 is welded on said tubes. The lower end 4 is pierced with an orifice 40 enabling the body of a derailleur to be fixed by a screw-nut connection.

The central C-shaped part 5 defines a notch with a lower wall 51 and an upper wall 52 which are rectilinear and parallel and are connected in the bottom of the notch by a concave part 50. The lower wall 51 is extended and terminates in an end 53 in the form of a blunt point having bevelled side edges 53a and 53b and upper edge 53c. The upper wall 52 is extended by a part 54 in the form of a downwardly curved nose. The nose 54 extends beyond the end 53 of the opposite wall 51 of the notch, and terminates in a blunt point 55 which is substantially at the level of the median axis of the notch of the C-shaped part 5, whilst remaining separated from the end 53 of the lower wall by a distance substantially equal to or slightly greater than the distance between walls 51 and 52. The lower face 54c of the nose 54 is concave and is connected to the rectilinear part of the upper wall 52 without forming any discontinutiy. The side walls 54a and 54b of the nose 54 are bevelled. On the other hand, the side faces 56, 57 of the C-shaped part 5 remain perfectly flat in their portion corresponding to the rectilinear walls 51 and 52 so that the nut and locknut which serve to immobilise the axle against the member 1 can abut, flat, on the side faces 56, 57 respectively of this member 1.

The side faces 56, 57 of the C-shaped notch 5 which constitute the central part of the member 1 are slightly offset towards the outside of the member 1 (FIG. 2). It is particularly advantageous if the offset part 57 of the face of the support 1 located opposite the free wheel of the bicycle has an appreciable thickness (for example of the order of 1.5 mm). A relatively thick offset part facilitates the manoeuvring of the lock nut which abuts thereagainst and also makes it easier to remove the chain manually from the sprocket wheels without said chain catching on the body of the support 1, although its upper part 2 and its front part 3 are generally slightly inclined, in a manner known per se, towards the free wheel, so that the end parts 2, 20 and 3,30 of the support 1 are substantially in line respectively with the stay and the base to which they are respectively with the stay and the base to which they are respectively connected. In particular, it is preferable that the support face of the offset part 57 on which abuts the lock nut fixing the axle of the wheel is substantially plumb with the face, turned towards the wheel, of the end 20 of the upper part 2 or of the end 30 of the front part 3, if said latter is more concave than the end 20 towards the axle of the wheel. The side face 56 which serves as support face for the nut fixed to the end of the axle of the wheel engaged in the support 1 is preferably slightly offset towards the outside of the member 1, but may have a relatively reduced thickness (for example of the order of 0.5 mm).

A lug 8 is formed in the upper part of the member 1, for example above the part 3 for connection to the substantially horizontal frame portion and serves to guide the derailleur-actuating cable. The lug 8 is slightly shifted towards the outside with respect to the general plane of the member 1 (cf. FIG. 2). The outside of the lug 8 is generally substantially cylindrical in form but the edges of the front faces 82 and 83 are rounded. The lug 8 is orientated slightly towards the outside of the member 1, the rear face 83 being more shifted than the front face 82 with respect to the plane of the member 1. The lug 8 is also slightly inclined downwardly, the rear face 83 being slightly lower than the front face 82. Thus, the loop formed by the derailleur-actuating cable (not shown), stands clear of the plane of the support 1 and is not a hindrance when the wheel is placed in position for locking the axle in the notch of the C-shaped part 5.

The cable-guiding lug 8 advantageously has an orifice whose first portion 80 has a reduced section at the level of the front face 82, and a second portion 81 has a larger section at the level of the rear part of the lug 8. In this case, the orifice portion 80 presents a diameter slightly larger than the diameter of the cable, whilst the orifice portion 81 has a diameter such that the cable protecting sheath may engage in the rear part of the lug 8 and abut against the internal face of the front wall 82.

A slot 84 may be made in the side part of the lug 8, between the orifices 80 and 81, so as to allow an easy manual removal of the derailleur control cable when the interior of the lug 8 is to be cleaned. To this end, it suffices to withdraw the end of the sheath engaged in the orifice 81, the cable being slack. The cable may then be easily withdrawn. The slot 84 is preferably located in a plane situated at about 45° with respect to a vertical plane passing through the centres of the orifices 80 and 81, so that the cable cannot escape from the lug 8 by itself.

A tab 9 (FIGS. 1 and 3) may be formed in the upper part of the support 1, for example on the branch 6, in order to allow the fixing of an end of a mud guard support rod with the aid of a connecting member which may be engaged in the orifice 90 made in the tab 9. This latter projects from the body of the support 1 and in particular from the branch 6 to which it is attached. The tab 9 is also slightly offset with respect to the branch 6 on the side of the support 1 opposite the wheel (cf. FIG. 3), in order to clear a space with respect to said wheel. A narrow groove or incipient crack 91 is formed between the outer part of the branch 6 and the tab 9 so that said latter may, if necessary, be sawn and removed without modifying the body of the support 1, if the support 1 which is originally formed by forging and provided to have the most universal application possible, is to be used in a bicycle without mud-guard.

Of course, various other modifications and additions may be made by the man skilled in the art to the embodiments which have just been described solely by way of non-limiting example, without departing from the scope of protection of the invention as defined by the accompanying claims.

Thus, the invention may naturally be applied to a support member whose notch for receiving the axle of the wheel does not have a nose in the extension of its upper face.

I claim:
1. A one-piece support member for a bicycle, the bicycle including a frame, a derailleur, a wheel having an axle, and a cable for actuating the derailleur, said one-piece support member comprising:
   an upper end adapted to be connected to the frame of the bicycle;
   a lower end adapted to support the body of the derailleur; first and second sides extending between said upper and lower ends;
   an elongated notch defined in said first and second sides, said elongated notch being adapted to receive the axle of the wheel arranged to oppose said first side of said support member; and
   a lug having a front part and a rear part integrally disposed on said support member above said elongated notch, said lug projecting outwardly with respect to the plane of said support member on said second side, and having an orifice through which the cable for actuating the derailleur is adapted to pass, said orifice having a reduced diameter at said front part, slightly larger than the diameter of the cable, and a larger diameter at said rear part to receive a sheath for protecting the derailleur actuating cable.

2. The support member of claim 1 wherein said orifice is slightly inclined downwardly and outwardly at said rear part.

3. The support member of claim 1 wherein said lug has rounded edges without sharp angles.

4. The support member of claim 1, wherein the side face of said lug has a slot so as to allow the derailleur-actuating cable to be manually withdrawn from said orifice of said lug.

5. The support member of claim 4 wherein said slot in said lug is located in a plane which forms an angle of about 45° with respect to the vertical.

6. The support member of claim 1, wherein said tab is laterally offset away from the surface of said first side of said support member.

7. A one-piece support member for a bicycle, the bicycle including a frame, a derailleur, a wheel having an axle, and a cable for actuating the derailleur, said one-piece support member comprising:
- an upper end adapted to be connected to the frame of the bicycle;
- a lower end adapted to support the body of the derailleur;
- first and second sides extending between said upper and lower ends;
- an elongated notch defined in said first and second sides, said elongated notch being adapted to receive the axle of the wheel with the wheel arranged to oppose said first side of said support member;
- a first offset portion in said first side of said support member adjacent said elongated notch, said first offset portion extending away from the face of said support member; said upper end being inclined so that the face of said first side of said support member at said upper end is substantially plumb with the outer face of said first offset portion; and
- a lug integrally disposed on said support member above said elongated notch, said lug projecting outwardly with respect to the plane of said support member on said second side and having an orifice through which the cable for actuating the derailleur is adapted to pass.

8. The support member of claim 1 further including a second offset portion in said second side of said support member adjacent said notch, said second offset portion extending outwardly away from the face of said second side of said support member.

9. The support member of claim 8 wherein said first offset portion has a thickness larger than said second offset portion.

10. The support member of claim 1 further comprising a tab for affixing a mud-guard rod, said tab projecting from the body of said support member.

* * * * *